United States Patent
Bell et al.

(10) Patent No.: US 7,757,493 B2
(45) Date of Patent: Jul. 20, 2010

(54) FLUID CATALYTIC CRACKING STEAM PRESSURE LETDOWN POWER RECOVERY SYSTEM AND PROCESS

(75) Inventors: Leonard E. Bell, Streamwood, IL (US); Keith A. Couch, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 671 days.

(21) Appl. No.: 11/369,296

(22) Filed: Mar. 7, 2006

(65) Prior Publication Data
US 2007/0209367 A1    Sep. 13, 2007

(51) Int. Cl.
*F02C 3/30*    (2006.01)

(52) U.S. Cl. .................. 60/775; 60/772; 60/39.182

(58) Field of Classification Search .................. 60/772, 60/775, 780, 783, 784, 39.55, 39.182
See application file for complete search history.

(56) References Cited

U.S. PATENT DOCUMENTS

| | | | | |
|---|---|---|---|---|
| 2,941,621 A | 6/1960 | Dygert et al. | ................. | 183/92 |
| 3,401,124 A * | 9/1968 | Goulden | .................... | 502/39 |
| 3,765,167 A * | 10/1973 | Rudolph et al. | ............... | 60/774 |
| 3,882,671 A * | 5/1975 | Nebgen | ...................... | 60/781 |
| 4,257,788 A | 3/1981 | Nassir | ......................... | 55/346 |
| 4,279,624 A | 7/1981 | Wilson | ............................. | 55/1 |
| 4,352,024 A * | 9/1982 | Geary et al. | ................... | 290/52 |
| 4,436,613 A | 3/1984 | Sayles et al. | ................... | 208/74 |
| 4,452,048 A * | 6/1984 | Geary et al. | ................... | 60/656 |
| 4,541,922 A * | 9/1985 | Lomas et al. | ................ | 208/164 |
| 5,114,682 A * | 5/1992 | Goelzer | ...................... | 422/142 |
| 5,690,709 A | 11/1997 | Barnes | ........................ | 55/348 |
| 5,779,746 A | 7/1998 | Buchanan et al. | ............. | 55/452 |
| 5,960,624 A | 10/1999 | Blotenberg | ................ | 60/39.02 |
| 6,137,022 A | 10/2000 | Kuechler et al. | ............ | 585/638 |
| 6,494,153 B1 * | 12/2002 | Lyon | ........................... | 110/345 |

FOREIGN PATENT DOCUMENTS

GB    2077631 A    12/1981
JP    8159415 A    6/1996

* cited by examiner

*Primary Examiner*—Michael Cuff
*Assistant Examiner*—Phutthiwat Wongwian
(74) *Attorney, Agent, or Firm*—James C Paschall

(57) ABSTRACT

A system and method are provided for recovering power from hot flue gas of a catalyst regenerator in an FCC unit and an integrated fluid catalytic cracking steam pressure letdown. The system includes a flue gas power recovery system including an expander and a turbine for generating power by letting down steam from a higher pressure to a lower pressure for use in a refinery process such as an FCC unit.

18 Claims, 1 Drawing Sheet

FLUID CATALYTIC CRACKING STEAM PRESSURE LETDOWN POWER RECOVERY SYSTEM AND PROCESS

BACKGROUND OF THE INVENTION

This invention generally pertains to fluid catalytic cracking (FCC) systems and processes, and more particularly to a system having a steam pressure let down integrated with a FCC unit, and further relates to recovering power from hot flue gas from an FCC catalyst regenerator.

FCC technology, now more than 50 years old, has undergone continuous improvement and remains the predominant source of gasoline production in many refineries. This gasoline, as well as lighter products, is formed as the result of cracking heavier (i.e., higher molecular weight), less valuable hydrocarbon feed stocks such as gas oil.

Refiners are more focused today than ever on improving utility consumption and reducing stack emissions. One area receiving significant interest is power recovery from the FCC flue gas, especially since this power is "clean" in that no additional $CO_2$ is produced or emitted.

While much work has been done over the past 40 years to improve the reliability and operability of FCC flue gas power recovery systems, the process has remained largely unchanged; that is, until now. Traditionally, the FCC flue gas power recovery system has all too often been treated as an "accessory," tacked on only to higher capacity, higher pressure FCC units in areas of high electrical cost. In order to make this technology useful for a wider range of FCC operators, innovative improvements have been developed to the way power recovery systems are incorporated into the FCC unit. These innovations significantly reduce the capital cost per unit of energy recovered from FCC unit flue gas in an environmentally friendly manner. These innovations can potentially double the return on investment (ROI) for a power recovery system when compared to traditional installations. This has greatly increased the application range of power recovery systems to FCC capacities for which it was previously considered uneconomical.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, the catalyst tends to accumulate coke thereon, which is burned off in the regenerator.

The heat of combustion in the regenerator typically produces flue gas at temperatures of 677° to 788° C. (1250° to 1450° F.) and at a pressure range of 138 to 276 kPa (20 to 40 psig). Although the pressure is relatively low, the extremely high temperature, high volume of flue gas from the regenerator contains sufficient kinetic energy to warrant economic recovery.

To recover energy from a flue gas stream, flue gas may be fed to a power recovery unit. A power recovery train may include several devices, such as an expander turbine, a generator, an air blower, a gear reducer, and a steam turbine. The expander turbine may be coupled to a main air blower shaft to power the air blower of a regenerator of the FCC unit. In an expander turbine, the pressurized gas axially enters and radially exits the turbine. The kinetic energy of the flue gas is transferred through blades of the expander to a rotor coupled to a shaft to generate mechanical shaft power. The shaft may be coupled to either to a regenerator air blower, to produce combustion air for the regenerator, and/or to a generator to produce electrical power. Because of the pressure drop of 138 to 207 kPa (20 to 30 psi) across the expander turbine, the flue gas typically discharges with a temperature drop of approximately 125° to 167° C. (225 to 300° F.). The steam turbine may be included in the power recovery train for starting up or running the air blower for the regenerator.

Steam is produced for many purposes in a refinery. The flue gas from an FCC regenerator may be run to a steam generator for further energy recovery. Low pressure steam is typically generated at 241 to 448 kPa (gauge) (35 to 65 psig). Medium pressure steam is typically generated at 2413 to 3275 kPa (gauge) (350 to 475 psig) and high pressure steam is typically generated at greater than 4137 kPa (gauge) (600 psig). The various levels of steam generation can be accommodated through either box-style or shell and tube heat exchangers, but the box-style exchanger must be used if the flue gas is at lower pressure.

In order to reduce damage to components downstream of the regenerator, it is also known to remove flue gas solids. This is commonly accomplished with first and second stage separators, such as cyclones, located in the regenerator. Some systems also include a third stage separator (TSS) or even a fourth stage separator (FSS) to remove further fine particles, commonly referred to as "fines".

The present invention provides a power recovery process comprising feeding steam to a turbine, letting down steam from a higher pressure to a lower pressure, generating power and directing steam exhaust from the turbine to an FCC unit.

One embodiment provides a power recovery system for use with an FCC unit, comprising a turbine for generating power by letting down steam from a higher pressure to a lower pressure for use in the FCC unit.

One embodiment provides a system for recovering power in an FCC unit, comprising a flue gas power recovery system including an expander; and a turbine for generating power by letting down steam from higher pressure to a lower pressure for use in a refinery process.

Additional features and advantages of the invention will be apparent from the description of the invention, figures and claims provided herein.

BRIEF DESCRIPTION OF THE DRAWING

The FIGURE is a schematic diagram of the present invention.

DETAILED DESCRIPTION

Figure 1:
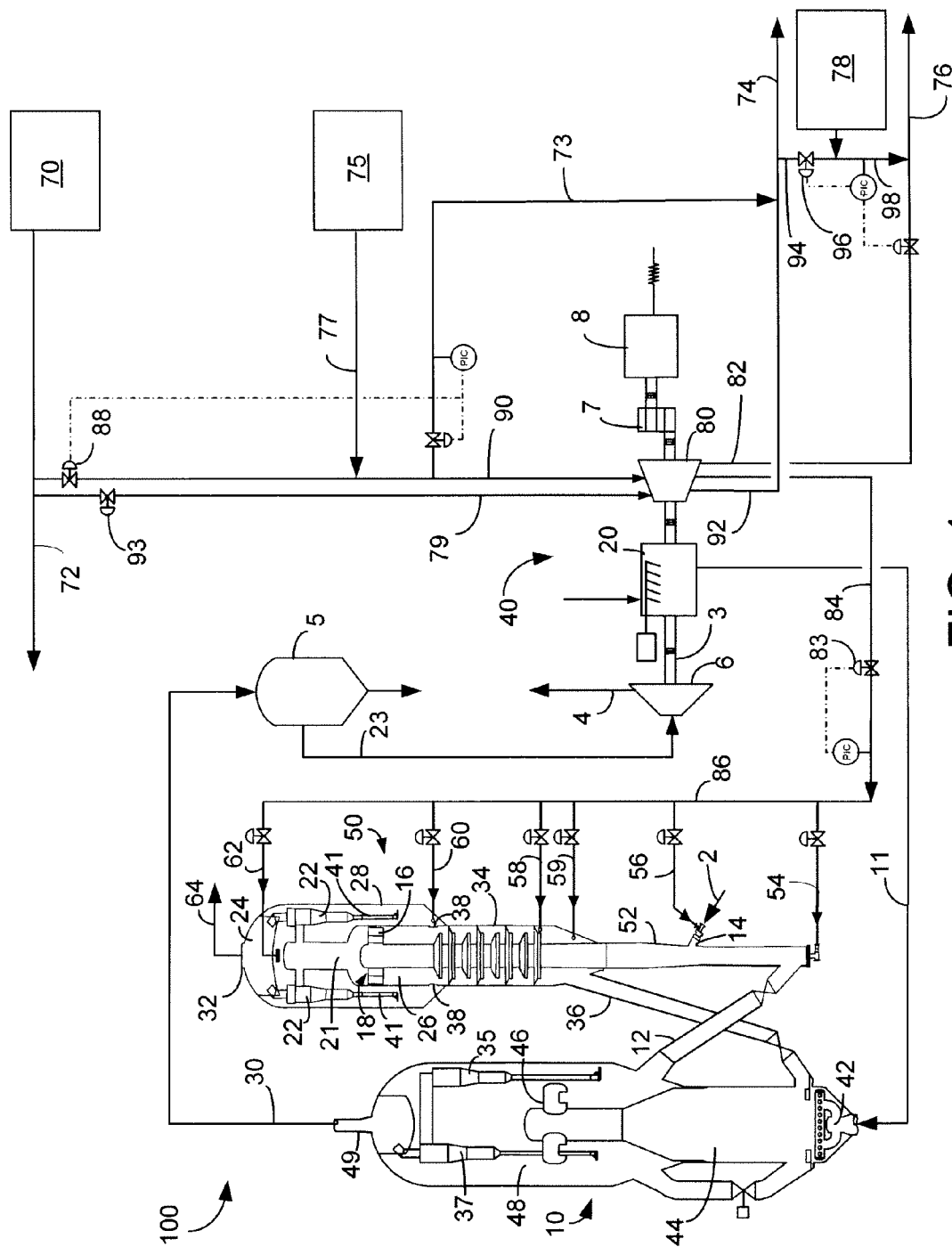

Turning to the drawing, wherein like numerals designate like components, the FIGURE illustrates an FCC system 100 that is equipped for power recovery. The FCC system 100 generally includes a catalyst regenerator 10 and a reactor 50. A main air blower 20 delivers air into the regenerator 10 via a line 11. Hot flue gas exits the regenerator 10 through a conduit 30 which directs the flue gas to a multiple cyclone separator 5, which removes the majority of remaining solid particles from the flue gas. Clean flue gas exits the separator 5 in a line 23 and drives an expander 6. Flue gas exits the expander 6 in a line 4.

In order to generate electricity, the FCC system 100 further includes a power recovery train 40 comprising the expander 6 and a power recovery generator 8. More specifically, the expander 6 has an output shaft 3 that may optionally drive the main air blower 20 and typically drives an optional gear reducer 7 that in turn drives the generator 8. The generator 8 provides electrical power that can be used as desired within the plant or externally. The air blower 20 may be powered by components in the power recovery train 40 or be decoupled from the power recovery train 40 and powered by a separate motor.

The FCC reactor 50 uses several process steam flows to a riser 52. These include, but are not limited to, riser lift steam in a line 54, riser startup steam (not shown), feed distributor dispersion steam in a line 56, spent catalyst stripping steam in lines 58 and 59, fluffing steam in a line 60 and dome steam in a line 62. Lift steam is delivered from the line 54 to the riser 52 to lift regenerated FCC catalyst fed from a regenerated catalyst conduit 12 in the riser 52. Feed distributor dispersion steam from the line 56 is fed to a feed distributor 14 to disperse hydrocarbon feed in a line 2 as it is injected into the riser 52 to contact the regenerated catalyst and crack to lower molecular-weight, valuable product vapors. Coke is deposited on the catalyst during cracking to produce spent catalyst while ascending the riser 52. As the mixture of spent catalyst and product vapors exits the riser 52 through outlets 16 of a swirl arm arrangement 18 in a separation chamber 26 partially contained in a reactor vessel 28, the spent catalyst is roughly separated from the product vapors. Spent catalyst from the outlets 16 drops down into a stripping section 34 of the separation chamber 26. In the stripping section 34, adsorbed vapors are stripped from the spent catalyst by counter-current steam flowing from stripping steam lines 58 and 59. The stripped spent catalyst exits the stripping section 34 through a stripped catalyst conduit 36 and is delivered to the regenerator 10. The product vapors from the outlets 16 ascend a gas recovery conduit 21 after exiting the separation chamber 26. The gas recovery conduit delivers product vapors with a light loading of spent catalyst to cyclones 22 to further separate catalyst from the product vapors. Product vapors with a lighter loading of spent catalyst exit the cyclones 22 and enter a plenum chamber 24 of the reactor vessel 28. The product vapors then exit the reactor vessel 28 of the FCC unit through an outlet 32 in a line 64. Spent catalyst and some product vapors exit the cyclones 22 through diplegs 41 and the catalyst drops into a bed in the annular region at the bottom of the reactor vessel 28. The spent catalyst from the reactor vessel 28 passes through windows 38 into the separation chamber 26 facilitated by fluffing steam from the line 60. From the windows 38, spent catalyst enters the stripping section 34. Dome steam from the steam line 62 ensures the product vapors from the cyclone diplegs 41 are purged into the separation chamber 26 through the windows 38 and are recovered through the gas recovery conduit 21. Stripped spent catalyst from stripped spent catalyst conduit 36 is contacted with air from a distributor 42 in the regenerator 10. The contact with air combusts coke deposits from the spent catalyst to regenerate the catalyst and generate flue gas. In a combustor regenerator, which is suitable for the present invention, the air and flue gas ascend from a lower chamber 44 to a separator 46 which separates regenerated catalyst from flue gas while entering an upper chamber 48. Regenerated catalyst is delivered to the base of the riser 52 by the regenerated catalyst conduit 12. Flue gas is further separated from regenerated catalyst in cyclones 35 and 37 and exits the regenerator 10 through an outlet 49.

The reactor 50 and the regenerator 10 typically operate at 103 to 276 kPa (gauge) (15 to 40 psig). The use of medium pressure steam is typically required for these services as opposed to low pressure steam to maintain sufficient supply pressure to overcome the reactor pressure, static head of catalyst, the differential pressure across the steam distributor(s), and the differential pressure across the control valves. High pressure steam can also be used for these services.

This steam that is injected into the reactor is heated up to the operating temperature of the reactor 50, and is one of the heat loads on the overall unit heat balance. The steam flows through the reactor 50 out a product outlet 32 and to the main fractionator (not shown).

It is proposed to let down steam pressure to the FCC unit across a steam letdown turbine to recover energy which up until now has been lost. In a steam turbine, the pressurized steam radially enters the turbine. A plurality of rotors axially spaced in the turbine are associated with turbine pressures that decrease in relation to the radius of the blades of the rotor or the diameter of the turbine at the axial location of the rotor. The steam may enter one of several inlets axially spaced from other inlets at an axial location that has an appropriate pressure. Steam radially exits the turbine at an axial location that has a pressure desirable for the line to which steam is exiting. The kinetic energy of the flue gas is transferred through blades of the turbine to a rotor coupled to a shaft to produce shaft power. The invention is particularly useful on FCC units equipped with the regenerator flue gas power recovery train 40. A steam letdown turbine 80 may be included in the power recovery train 40, and the turbine steam exhaust can be integrated into the FCC system 100 to supply a lower superheat steam to the reactor. In this manner, the energy of the steam pressure drop across the letdown turbine 80 is transferred to the shaft of the power recovery train, and used to either provide the main air blower power requirement not already provided by the expander 6 and/or to produce electricity in the generator 8.

The typical properties for medium pressure steam and high pressure steam in FCC units are shown in the Table. The heat drop across a standard pressure letdown control valve, and the head drop across a steam turbine operating at 80% efficiency are also shown in the table. If the steam is letdown across a steam turbine, the recovered energy is substantial and is shown in the right-hand column.

TABLE

|  | Pressure (psig) | Temp. (° F.) | Superheat (° F.) | Enthalpy (Btu/lb) | Heat Drop (Btu/lb) | Recovered Energy (Btu/lb) |
| --- | --- | --- | --- | --- | --- | --- |
| Medium Pressure Steam | 450 | 680 | 230 | 1347 |  |  |
| MP steam letdown across a control valve | 100 | 582 | 245 | 1319 | 28.456 |  |
| MP steam letdown across a turbine | 100 | 416 | 78 | 1234 | 113.830 | 85.374 |
| High Pressure Steam | 600 | 750 | 150 | 1378 |  |  |
| HP steam letdown across a control valve | 100 | 631 | 294 | 1344 | 35.103 |  |
| HP steam letdown across a turbine | 100 | 425 | 87 | 1238.5 | 140.410 | 105.307 |

As a minor benefit, letting the steam down across a turbine and producing shaft work reduces the steam temperature to the reactor. The lower steam temperature is a heat load on the system which requires additional catalyst circulation from the regenerator to bring the steam up to the reactor temperature. There is a minor increase to the catalyst-to-oil ratio that directionally improves the product selectivities from the FCC unit.

In an integrated and optimized process system in which the process steam flows to the FCC reactor, steam can be supplied through the traditional manner of a letdown from either the high pressure or the medium pressure steam header to the reactor steam flow control valves. Included within the system design, the steam is alternatively directed to a steam letdown turbine integrated with the power recovery train. Although medium pressure steam has traditionally been used for this service, any steam supply higher in pressure than the reactor could be used. In application, the higher the steam supply pressure, the greater the economic return on integrated electrical power generation. The turbine exhaust pressure is a controlled variable with which the operator can control the amount of superheat remaining in the steam. The lower the exhaust pressure, the lower the remaining superheat in the steam. The lower the remaining superheat in the steam, the higher the electrical power generation from the power recovery train and the greater the increase in catalyst-to-oil ratio.

Referring again to the FIGURE, most refineries operate a boiler house 70 that generates a single level of high pressure steam that is distributed to the refinery by a header 72. Lower levels of steam are supplied by successive letdown stations to a medium pressure steam header 74 and a low pressure steam header 76. Additional medium pressure steam is often provided by other sources represented by 75 in the refinery such as from exhausting steam turbines provided by a line 77. Additionally, low pressure steam is also often provided by other sources represented by 78 in the refinery such as from exhausting steam turbines which feeds the low pressure steam header 76. A first portion of the high pressure steam from the high pressure steam header 72 governed by a control valve 93 is delivered via a line 79 to the steam turbine 80. The let down of the high pressure steam in the turbine 80 turns the blades in the turbine 80 to generate shaft power to generate electricity in generator 8 and/or to power the main air blower 20. Medium pressure steam in a line 92 feeds the medium pressure steam header 74. In an embodiment, an intermediate exit from the turbine 80 delivers steam at appropriate pressure just above FCC unit pressure to account for pressure heads and drops to a steam riser 86 for the FCC system 100 via a line 84 governed by pressure control valve 83. Alternatively, the line 84 can branch from the medium pressure steam header 74 or the low pressure steam header 76 can branch from the line 84, but both of these alternatives would require a further letdown valve wasting steam power recovery after being let down to an appropriate pressure by a back pressure valve 83. The steam riser feeds steam lines 54, 56, 58, 59, 60 and 62 to the FCC reactor 50. A bypass line 73 feeds medium pressure steam to the medium pressure steam header 74 if the turbine 80 is not operating. A second portion of the high pressure steam may be let down over a pressure control valve 88 in a line 90 to the medium pressure steam and is delivered to the steam turbine 80 to compensate for insufficient medium pressure steam provided in the line 77 from other sources 75 in the refinery. In optimal operation, all of the medium pressure steam will be provided by the refinery sources 75, so no energy is wasted over the valve 88. The medium and high pressure steam may be fed at different appropriate axial points on the steam turbine 80 with steam exits taken at different axial points of appropriate pressure. Additionally, medium and high pressure steam may be provided from other sources in the refinery without being run through the turbine 80. The steam turbine lets down the medium pressure steam from the line 90 to intermediate FCC pressure in the line 84 and low pressure steam exiting in a line 82 while generating further shaft power. The low pressure steam in the line 82 joins low pressure steam from other sources 78 in the refinery and make up medium pressure steam from a bypass line 94 taken down over a pressure control valve 96 via a line 98 in the event of turbine bypass when the turbine 80 is out of service to feed the low pressure steam header 76.

In an embodiment, it is also contemplated that the steam letdown turbine 80 be decoupled from the shaft 3 and coupled to the generator 8 independently of the expander 6. The shaft 3 and the shaft of the turbine have separate entries into the generator 8. This embodiment allows the steam turbine 80 to be disengageably coupled to the generator by a clutch gear (not shown). In this embodiment, the turbine 80 can be taken out of service while the power recovery train 40 is still in operation.

In this configuration, HP or MP steam can be let down efficiently across the turbine into the lower pressure steam headers. The energy transferred to the generator shaft is used to produce supplemental electrical power. To optimize this configuration, the power recovery train 40 needs to be sized to accommodate the proper steam letdown requirements to meet the refinery's needs. As depicted, multiple levels of steam letdown can be accommodated through a single turbine. This utility integration is a process design that extends beyond the battery limits of the FCC unit, and allows the refiner to optimize the economics of operating their facility-wide steam and electrical systems.

Example

The integrated installation of a regenerator flue gas power recovery train can be economically advantageous to the refiner. The total installed cost of a power recovery train with a letdown turbine is estimated at $20 million. Based on a typical 4 to 5 wt-% steam to the FCC reactor on a fresh feed basis and processing 42,000 barrels of feed per day in maximum gasoline mode of operation, the power recovery train can recover at least 13.2 MW-hr of power per day. The discounted cash flow return on investment is about 23.1%. This integration of the subject invention becomes even more attractive in FCC applications in which the regenerator pressure is low, resulting in marginal economics for the installation of a power recovery train, and/or when the FCC unit has greater steam requirements, resulting in greater power recovery over the turbine 80.

What is claimed is:

1. A power recovery process, comprising
   feeding steam to a steam turbine in a fluid catalytic cracking (FCC) power recovery train that includes a flue gas expander;
   letting down steam in the steam turbine from a higher pressure to an intermediate FCC pressure;
   generating power from the steam turbine;
   directing steam exhaust from the steam turbine to an FCC reactor; and
   generating power from a flue gas from an FCC unit in said flue gas expander on the power recovery train.

2. The process of claim 1 wherein said power is transferred from a shaft to an electrical generator or an air blower.

3. The process of claim 1 further including letting down steam to medium pressure steam and low pressure steam.

4. The process of claim 1 further including letting down the steam exhaust to a lower pressure before delivering the steam to the FCC reactor.

5. The process of claim 1 further including letting down high pressure steam to medium pressure steam and separately letting down medium pressure steam to low pressure steam.

6. The process of claim 5 wherein intermediate pressure steam is fed from the steam turbine to the FCC reactor.

7. A power recovery system for use with an FCC unit, comprising a boiler house for generating steam;
a steam header that distributes steam from the boiler house to a refinery;
a line for delivering a portion of steam from said steam header to a steam turbine for generating power by letting down steam from higher pressure to an intermediate FCC pressure;
a flue gas expander which lets down flue gas from a catalyst regenerator of the FCC unit from a higher pressure to a lower pressure to generate power; and
a line for delivering steam from the steam turbine to an FCC reactor of the FCC unit.

8. The system of claim 7 further including a multi-cyclone separator on a flue gas line between said regenerator and said expander.

9. The system of claim 7 wherein a high pressure steam line feeds the steam turbine and a medium pressure steam line exits the steam turbine.

10. The system of claim 8 wherein a low pressure steam line exits the steam turbine.

11. The system of claim 10 wherein portions of the low pressure steam and medium pressure steam are fed to other operations in the refinery.

12. The system of claim 7 wherein said line for delivering steam to the FCC unit feeds many lines that deliver steam to different parts of the FCC unit.

13. A system for recovering power in an FCC unit, comprising:
a flue gas power recovery system including a flue gas expander in communication with a flue gas outlet for a catalyst regenerator, said expander for generating power;
a boiler house for generating steam;
a steam header that distributes steam from the boiler house to a refinery;
a line for delivering a portion of steam from said steam header to a turbine; and
said turbine for generating power by letting down said steam from said boiler house from a higher pressure to a lower pressure, said steam for use in a refinery process.

14. The system of claim 13 further including a multi-cyclone separator on a flue gas line between said regenerator and said expander.

15. The system of claim 13 wherein a high pressure steam line feeds the turbine and a medium pressure steam line exits the turbine.

16. The system of claim 13 wherein a shaft from the expander and a shaft from the turbine have separate entries into the generator.

17. The system of claim 13 wherein said steam is fed to an FCC unit.

18. The system of claim 17 wherein said line for delivering steam to the FCC unit feeds many lines that deliver steam to different parts of the FCC unit.

* * * * *